United States Patent

Cook

Patent Number: 5,271,177
Date of Patent: * Dec. 21, 1993

[54] FISH HOOK ATTACHMENT FOR FISH HOOD CONSTRUCTION

[75] Inventor: Russell P. Cook, Wellesley, Mass.

[73] Assignee: Wellesley Research Associates, Inc., Wellesley, Mass.

[*] Notice: The portion of the term of this patent subsequent to Apr. 6, 2010 has been disclaimed.

[21] Appl. No.: 913,207

[22] Filed: Jul. 15, 1992

Related U.S. Application Data

[63] Continuation-in-part of Ser. No. 674,113. Mar. 25, 1991, Pat. No. 5,199,209, which is a continuation-in-part of Ser. No. 525,644, May 21, 1990, Pat. No. 5,056,257, which is a continuation-in-part of Ser. No. 441,638, Nov. 27, 1989, Pat. No. 4,987,696.

[51] Int. Cl.⁵ ............................................. A01K 85/00
[52] U.S. Cl. ................................................... 43/43.16
[58] Field of Search ................. 43/43.16, 44.82, 42.09, 43/44.91, 42.38, 44.8

[56] References Cited

U.S. PATENT DOCUMENTS 4,796,378  1/1989  Krueger ............................. 43/43.2

Primary Examiner—Kurt C. Rowan
Attorney, Agent, or Firm—Paul J. Cook

[57] ABSTRACT

A fish hook attachment is provided which includes at least one (a) hydrofoil or (b) stabilizer and hydrofoil of unitary construction secured to a hollow shank having a slot which extends along the length of the hollow shank. Each unitary construction is secured to a hook shank so that the hydrofoil portion is positioned at an angle between 5° to 85° degrees from the hook shank. The hydrofoil portion of the unitary construction is positioned substantially perpendicular to the plane defined by the hook shank and hook elbow. The hydrofoil is positioned below an elbow of the hook.

4 Claims, 1 Drawing Sheet

FISH HOOK ATTACHMENT FOR FISH HOOD CONSTRUCTION

REFERENCE TO RELATED APPLICATION

This application is a continuation-in-part of application Ser. No. 674,113, now U.S. Pat. No. 5,199,209 filed Mar. 25, 1991, which in turn is a continuation-in-part of application Ser. No. 525,644, filed May 21, 1990, now U.S. Pat. No. 5,056,257, which, in turn is a continuation-in-part of application Ser. No. 441,638, filed Nov. 27, 1989, now U.S. Pat. No. 4,987,696.

BACKGROUND OF THE INVENTION

This invention relates to a fish hook attachment to a fish hook to produce a fish hook construction adapted to increase the probability of implanting the hook into the tissue of a fish's mouth and decreases the probability of swallowing the hook by a fish during use by an angler.

Prior to this invention, it has been proposed in U.S. Pat. No. 699,397 to provide a fish hook with a vane or a hydrofoil which extends in a direction from the hook shank directly opposite to the direction of extension of the hook. By utilizing such a hydrofoil or vane, when the line attached to the hook is pulled, the hook will move upwardly toward the direction of pull. This upward move is caused by the drag imposed by the hydrofoil or vane which functions as a fulcrum to provide the upward hook movement. If the hook is positioned so that the hook extends away from the fish, the sudden pulling and upward movement of the hook will cause the hook to move away from the fish thereby rendering the hook useless. Accordingly, it would be desirable to provide a fish hook which improves the probability of implanting the barbed point portion of the hook into the jaw or tissue of the mouth of the fish during use by an angler.

SUMMARY OF THE INVENTION

This invention provides a fish hook attachment which, with a conventional fish hook forms a fish hook construction which utilizes at least one unitary construction comprising a hydrofoil or a stabilizer hydrofoil rigidly secured to a hollow sleeve. The attachment is secured to a conventional hook positioned in a manner which promotes implanting the barbed point portion of the hook into the side of the mouth of a fish during use by an angler. The hydrofoil or hydrofoil portion of the unitary construction is positioned at an angle between 5°-85° from the hook shank in a direction toward the hook elbow as well as being positioned perpendicular to the plane defined by the shank and hook elbow. The fish hook attachment is conveniently snap fit onto a conventional fish hook. The hydrofoil or hydrafoil portion is positioned below the hook elbow after being snap fit on a convention fish hook. The probability of the hook being implanted into the mouth parts of the fish is substantially increased when the line attached to the hook is pulled by the angler.

DESCRIPTION OF SPECIFIC EMBODIMENTS

In accordance with this invention, a fish hook attachment comprising a unitary construction having either (a) hydrofoil or (b) a hydrofoil and a stabilizer attached to a fish hook shank. The unitary construction is formed integrally with a hollow sleeve. The hydrofoil is positioned at an angle between 5°–85° from the hook shank in a direction substantially perpendicular to the plane defined by the shank and the elbow of a hook. One or more unitary constructions each positioned in the same manner can be attached to the hollow sleeve. The hollow sleeve includes a slot extending its entire length and the hook shank is secured to the sleeve by being snap fit through the slot. The hollow sleeve is formed of a flexible material such as a polymeric resin so that it can be snap fit around the hook shank.

In use, when a line attached to the hook is pulled by the angler, the hydrofoil positioned on the hook shank provides hydrodynamic lift so that the hook barb is lifted in a direction the same as the direction of the hydrofoil. Since the hydrofoil is positioned at an angle between about 5° and 85°, preferably from 30° to 60° from the axis defined above, the hook is lifted in a direction toward the mouth of the fish. In any event, the hook is not moved in a direction away from the fish mouth tissue. Thus, the fish hook of this invention provides greatly improved probability of being implanted into the mouth tissue of the fish.

Figure 1:
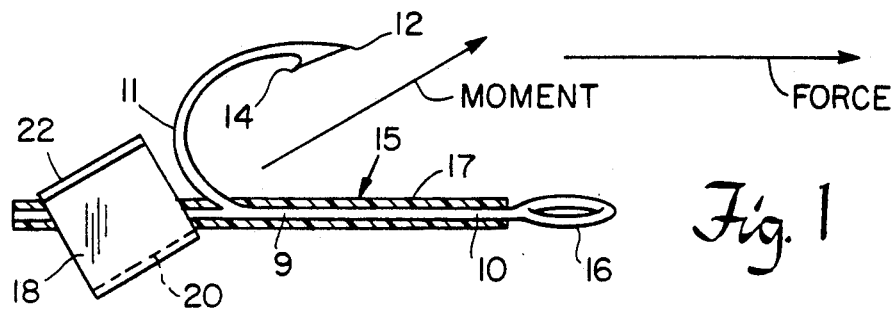
FIG. 1 is a side view in partial cross section of a hook construction including the fish hook attachment of this invention having two hydrofoils positioned in opposite direction to each other.
Figure 2:
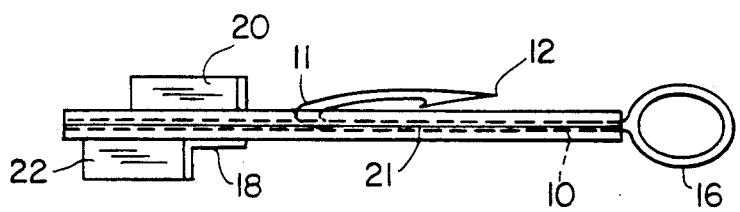
FIG. 2 is a top view of the hook attachment of FIG. 1.

Referring to FIGS. 1 and 2, the fish hook attachment of this invention is secured to a hook 9 comprises a fish hook shank 10, an elbow 11, a hook 12 and a hook barb 14 of unitary construction. A loop 16 is attached to hook shank 10 in order to provide a means for attaching a line to the hook construction. The attachment 15 of this invention includes a hollow shank 17 and a unitary construction comprising a stabilizer 18 and two hydrofoils 20 and 22 extending in opposite directions to each other is attached to the hook shank 10 by being snap fit by means of a slot 21 (FIG. 20 which permits the hollow shank 17 to be positioned around hook shank 10. The hydrofoils 20 and 22 extend in a direction between 30 to 60 degrees from the hook shank (See FIG. 3) as well as being positioned perpendicular to the plane defined by the shank 10 and hook elbow 11 from an axis defined by hook 12 and the cross section of shank 10. As shown in FIG. 1, the barb 14 extends from the hook 12 toward shank 10.

Figure 3:
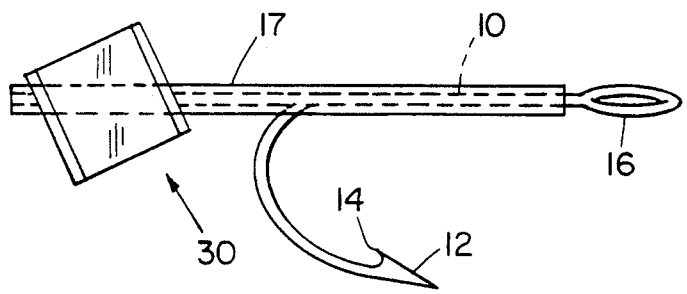
FIG. 3 is a side view of the hook attachment of this invention having multiple unitary construction comprising a stabilizer and hydrofoils.
Figure 4:
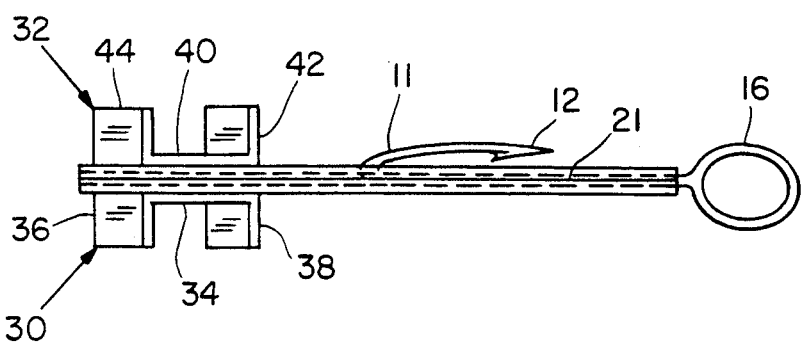
FIG. 4 is a top view of the hook attachment of FIG. 3.

An alternative embodiment is shown in FIGS. 3 and 4 wherein reference numerals as in FIGS. 1 and 2 refer to the same fish hook construction elements. As shown in FIGS. 3 and 4, a plurality of hook attachments comprising a hollow shank 17 and unitary constructions 30 and 32 are shown. The unitary construction 30 comprises a stabilizer 34 and two hydrofoils 36 and 38. The unitary construction 32 comprises a stabilizer 40 and two hydrofoils 42 and 44. The unitary constructions 30 and 32 are positioned so that the hydrofoils 36, 38, 42 and 44 are at an angle between 5° and 85° from the plane defined by the shank 10 and elbow 11. As shown in FIGS. 1-4, the hydrofoils are positioned below the hook elbow 11 when the attachment is snap fit on the shank 10.

The surface design of the hydrofoil is not critical to the present invention so long as it provides hydrodynamic drag when a line attached to the loop 16 is pulled. Thus, the hydrofoil can have a circular plan view, elliptical cross-section, triangular cross-section or the like and can be provided with small holes if desired. Also, the present invention contemplates one or a plurality of hooks attached to one or a plurality of hook shanks, each of which are attached to a common unitary construction, if desired.

I claim:

1. An attachment adapted to fit about a shank of a fish hook, said fish hook having a hook shank, a hook barb attached by a hook elbow to said shank, said hook barb defining one end of said construction, said attachment comprising a hollow sleeve having a slot extending the entire length of said sleeve, said sleeve having a size to permit said sleeve to fit tightly about said hook shank, a hydrofoil having a first surface rigidly secured to said sleeve, said hydrofoil extending in a direction between 5° and 85° from the hook shank in a direction away from said hook elbow, said first surface being positioned perpendicular to a plane defined by the shank and the hook elbow, said hydrofoil having a free unsecured end, said sleeve extending past said hook elbow, said hydrofoil being positioned on the portion of the sleeve extending past said hook elbow, and means for attaching a line to said hook.

2. The construction of claim 1 wherein a plurality of hydrofoils are positioned on said sleeve in the direction of claim 1.

3. The construction of claim 1 wherein said hydrofoil is positioned between 30° and 60° from the sleeve shank.

4. The construction of claim 2 wherein said hydrofoils are positioned between 30° and 60° from the sleeve shank.

* * * * *